E. B. REESE.
AUTOMATIC ELECTRIC POWER PLANT.
APPLICATION FILED AUG. 14, 1916.

1,361,097.

Patented Dec. 7, 1920.
2 SHEETS—SHEET 1.

WITNESSES:

INVENTOR
Edward B. Reese
BY
Bradford F. DeCoste
ATTORNEYS

E. B. REESE.
AUTOMATIC ELECTRIC POWER PLANT.
APPLICATION FILED AUG. 14, 1916.

1,361,097.

Patented Dec. 7, 1920.

UNITED STATES PATENT OFFICE.

EDWARD B. REESE, OF INDIANAPOLIS, INDIANA, ASSIGNOR TO SWARTZ ELECTRIC COMPANY, OF INDIANAPOLIS, INDIANA, A CORPORATION OF INDIANA.

AUTOMATIC ELECTRIC-POWER PLANT.

1,361,097.   Specification of Letters Patent.   Patented Dec. 7, 1920.

Application filed August 14, 1916. Serial No. 114,909.

*To all whom it may concern:*

Be it known that I, EDWARD B. REESE, a citizen of the United States, residing at Indianapolis, Marion county, and State of Indiana, have invented and discovered certain new and useful Improvements in Automatic Electric-Power Plants, of which the following is a specification.

My invention relates to automatic control electric power systems and its object is to provide in combination with a plurality of sources of electrical energy of which one or more is a dynamo electric machine driven from an internal combustion engine, means for automatically relieving the compression on the engine when the same is started and means for automatically closing the compression relief port after the engine is running freely. The invention also contemplates the use of an electrically controlled valve of simple and efficient construction for regulating such compression relief.

With these objects in view, my invention is embodied in preferable form in the arrangement hereinafter described and illustrated in the accompanying drawings.

Figure 1:
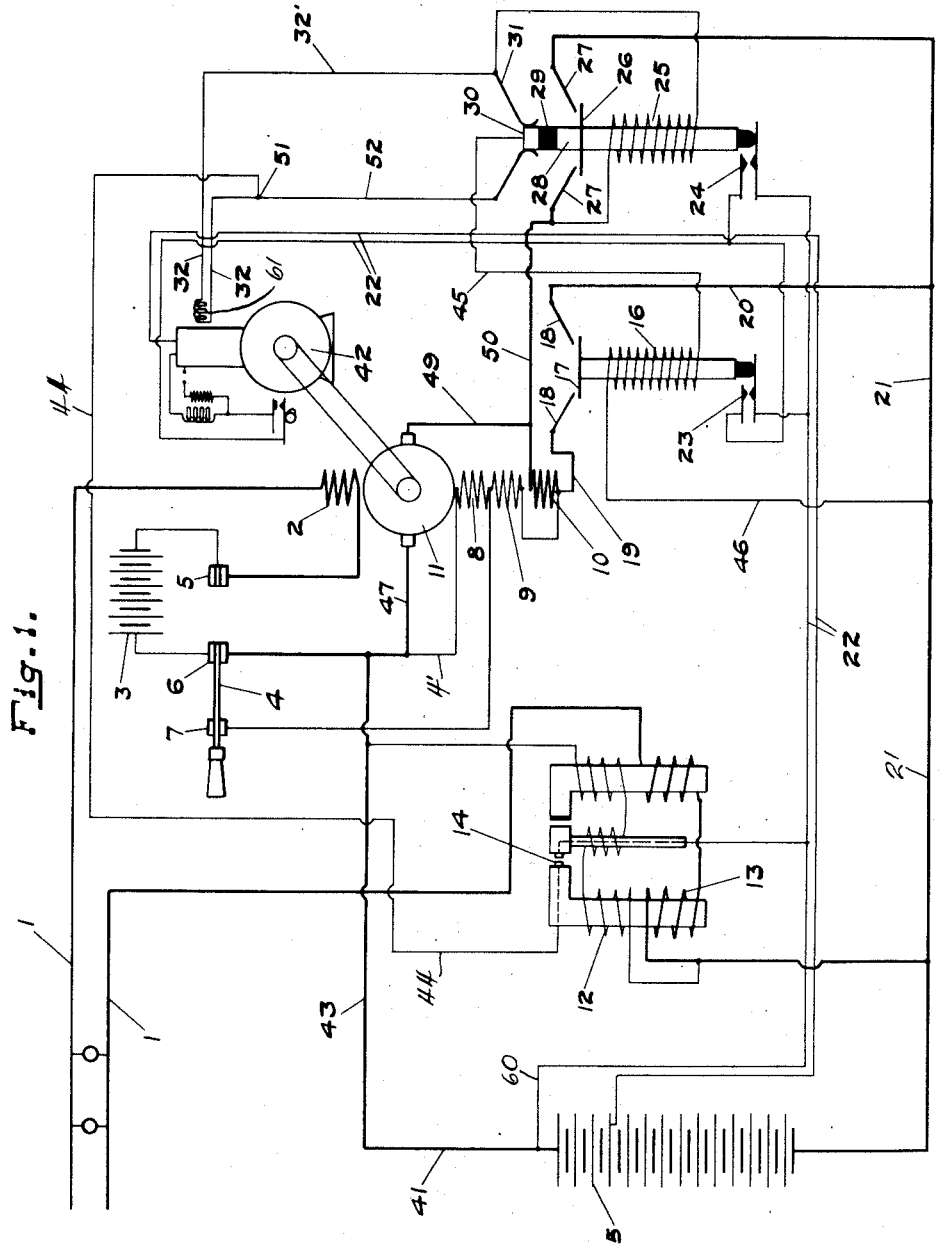
Figure 2:
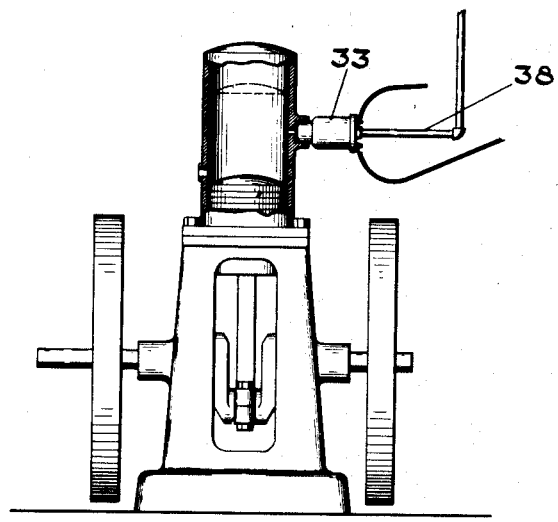
Figure 3:
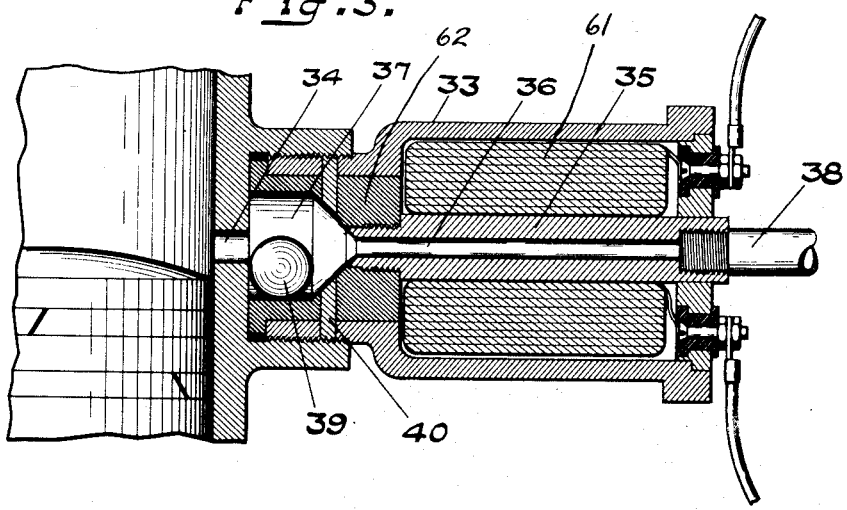

In these drawings, Figure 1 is a diagrammatic view of the automatic control electric power system including the relief means and illustrating the circuits through the various parts of the system forming the subject of my co-pending application, Serial No. 114,907 for automatic electric generating system; Fig. 2 is a side view in elevation partly in vertical section of the compression relief mechanism as applied to an engine and Fig. 3 is a vertical enlarged section through the relief mechanism.

Referring to the drawings and first to Fig. 1, 1 is the load line, 2 the series winding of a dynamo electric machine acting as a motor or as a generator and 3 a line resistance consisting preferably of counter electromotive force cells. 4 is a single pole double throw switch adapted to normally connect the terminals 5 and 6 to short circuit the resistance 3 and also adapted to connect the terminals 6 and 7 when it is desired to give a refreshing charge from the generator to the battery, and which connection serves to short circuit a shunt field resistance 8 and increase the strength of the shunt field 9 which has electrical connection with the starter resistance 10 of a dynamo electric machine 11 connected to the terminal 6. The line 1 also leads through a series winding 13 of a master switch described and claimed in my co-pending application Serial No. 114,908. The switch also has a shunt winding 12 and consists of a current and voltage relay. The shunt winding 12 connects with the battery 15. A prime mover 42 consisting of an internal combustion engine is adapted to drive the dynamo electric machine acting as a generator and also to be started by the latter, acting as a motor.

A shunt wound solenoid motor switch 16 has a movable contact 17 adapted to open and close the circuit through fixed contacts 18, one of which leads by conductor 19 through the field and the other of which leads by conductor 20 to the supply line 21, and which motor switch controls the starting of the dynamo electric machine to effect the starting of the prime mover and controls the ignition circuit 22 for the prime mover, the latter control being effected through spring contacts 23.

These contacts are in parallel with a pair of spring contacts 24, the circuit through which is made or broken by the movement of a core of a shunt wound solenoid generator switch 25. The core of said latter switch carries a movable contact 26 at its upper end adapted to engage the fixed contacts 27 connecting to the generator and battery respectively. The core also carries a circuit closing and interrupting member 28 having a fibrous non-conducting base portion 29 and an upper conducting contact portion 30, which member is adapted to make and break the circuit between the spring contacts 31 which controls an auxiliary circuit 32 controlling a magnetic engine-compression relief mechanism.

Referring to Figs. 2 and 3 the magnetic relief device is shown structurally therein and consists of a shell 33 constituting part of the field of an electro-magnet and adapted to be threaded into a boss formed in the side wall of an engine cylinder. An exit opening 34 leads through the cylinder wall and is adapted to permit the escape of part of the compressed gases therethrough when the engine is being started. The core 35 of the electro-magnet 61 has a longitudinal passageway 36 adapted to communicate through a valve chamber 37 with the exit port 34 at one end and with the exhaust pipe 38 or the atmosphere at the other end. 39 is an iron ball valve mounted in the valve chamber 37 constituting in effect a movable armature and adapted to be magnetically attracted to the seat of the opening leading to the passageway 36 by means of the attractive force of the poles formed by the seat and the pole pieces 40 when the electro-magnet is energized, whereby the ball valve will be drawn against the opening so as to close the passageway and prevent the escape of the air and gases through the port 34 and upon the deënergization of the magnet the ball will be released and permitted to roll by gravity to the bottom of the chamber, whereby a continuous free passageway will be established through the port 34 and the channel 36 permitting the compression to be relieved during the starting operation of the engine and until the motor becomes a generator. The inner end of the magnet is provided with a brass bushing 62 surrounding the end of the core and forming the chamber 37.

The pole pieces 40 are spaced longitudinally from the seat at the opening to the passageway and project opposite to one another. By this arrangement two concentric fields of attraction for the ball armature are provided and the pole pieces of opposing polarity are spaced apart equally at all points thus lessening the air gap between them and the contact at the seat, and preventing unequal resistance between the contacts.

The operation of the system is as follows:—

The single pole double throw switch 4 is thrown to connect the terminals 5 and 6. Connection will be established with the line at this point but no current will flow until the circuit is completed in the line by turning on one of the lights.

Thereupon the circuit will be as follows: From battery 15, through lead 41 to terminal 6, across switch to terminal 5 through series winding 2 to line 1 back through line 1 to series winding 13 of the master switch to battery 15. There is a complete circuit from battery 15 through line 43, through shunt winding 12 to battery 15. Thereupon the force exerted by the series winding of the master switch will overcome the force exerted by the shunt winding and the terminal 14 will be attracted to the opposing pole piece or contact. Thereupon a circuit will be formed from battery 15 through line 60, through terminal 14, through line 44, to line 52 to contact 31, to conductor contact 30, through line 45 to winding of solenoid switch 16, through line 46 to line 21 to battery 15. In this position the compression relief circuit 32, 32' is short circuited, leaving the compression relief valve open.

Thereupon the core of the solenoid motor switch 16 is raised making contact between contacts 17 and 18, and also permitting the spring ignition contacts 23 to close establishing the ignition circuit. A circuit will be formed from battery 15, through line 43, through line 47, through the armature, line 49, series winding or starter resistance 10, through line 19, contact 18, contact 17, opposite contact 18, line 20, line 21 and back to battery 15. Another circuit is formed from battery 15, through lines 41 and 43, line 4, shunt field resistance 8, shunt field winding 9, line 19, contacts 18, 17 and 18, lines 20 and 21 and back to battery 15.

This causes the dynamo electric machine to start as a motor and when the engine attains full speed, it overruns the motor driving the latter as a generator. Thereupon the circuit will be out of the armature through lines 49 and 50 solenoid winding 25, contact 31, contact 30, opposite contact 31, through line 52, line 44, to contact 14, line 60, lines 41 and 43, line 47 to the other other side of the generator armature, thus energizing solenoid 25 raising the core thereof and breaking the circuit between contacts 31 by interposing non-conductor 29 making contact between contacts 26 and 27, and permitting ignition contacts 24 to close. This breaks the circuit in line 45 permitting core of solenoid 16 to drop breaking contact between contacts 17 and 18, thus opencircuiting series winding 10 and opening ignition contacts 23, the ignition circuit remaining closed through contacts 24.

The compression relief circuit is from the armature through line 49, line 50, winding 25, contact 31, line 32', compression relief winding 61, out on line 32 to junction point 51, through line 44, contact 14, line 60, lines 41 and 43 and to the other side of the armature, thus closing the compression relief circuit, energizing the electro magnet 61, and attracting the ball valve 39 to its seat so as to close the relief opening. The generator circuit is now out of armature on line 49, line 50, contact 27, across 26 to other contact 27, line 21 to battery 15, out of battery on lines 41 and 43, line 47 to the armature, thus completing armature circuit. The shunt circuit is out of armature, on line 49, through series winding 10, shunt winding 9, shunt field resistance 8, through line 4', and line 47 to the armature.

Having thus described my invention what I claim is:

1. In a system of electric power control, including a prime mover, a dynamo electric machine, a compression relief device comprising a compression relief opening in the cylinder of said prime mover, a closure therefor, said closure being in inoperative position when said prime mover is at rest or starting, and means acting magnetically directly on said closure for causing said closure to cut off said opening when said prime mover attains a predetermined speed.

2. In a system of electric power control, including a prime mover, a dynamo electric machine, a compression relief device comprising a compression relief opening in the cylinder of said prime mover, a closure of magnetic material for said opening, said closure being in inoperative position when said prime mover is at rest or starting, means to magnetically act upon said closure to cut off said opening when said prime mover attains a predetermined speed comprising a solenoid in proximity to said closure and adapted to be energized by the energy generated by said dynamo electric machine to draw said closure into closing position.

3. In a system of electric power control, including a prime mover, a dynamo electric machine, a compression relief device comprising a compression relief opening in the cylinder of said prime mover, a closure of magnetic material for said opening, said closure being in inoperative position when said prime mover is at rest or starting, means to magnetically act upon said closure to cut off said opening when said prime mover attains a predetermined speed comprising a solenoid in proximity to said closure and adapted to be energized by the energy generated by said dynamo electric machine to draw said closure into closing position, a solenoid switch, and means for actuating the same for energizing said solenoid.

4. In a system of electric power control, including a prime mover, a dynamo electric machine, a compression relief device comprising a compression relief opening in the cylinder of said prime mover, a magnetic seat in proximity to said opening, a closure for said seat composed of magnetic material and means for magnetizing said seat by the energy generated by said dynamo electric machine.

In witness whereof, I have hereunto set my hand and seal at Indianapolis, Indiana, this 26th day of June, A. D. nineteen hundred and sixteen.

EDWARD B. REESE. [L. S.]

Witnesses:
  A. C. RICE,
  H. P. DOOLITTLE.